Patented Oct. 21, 1952

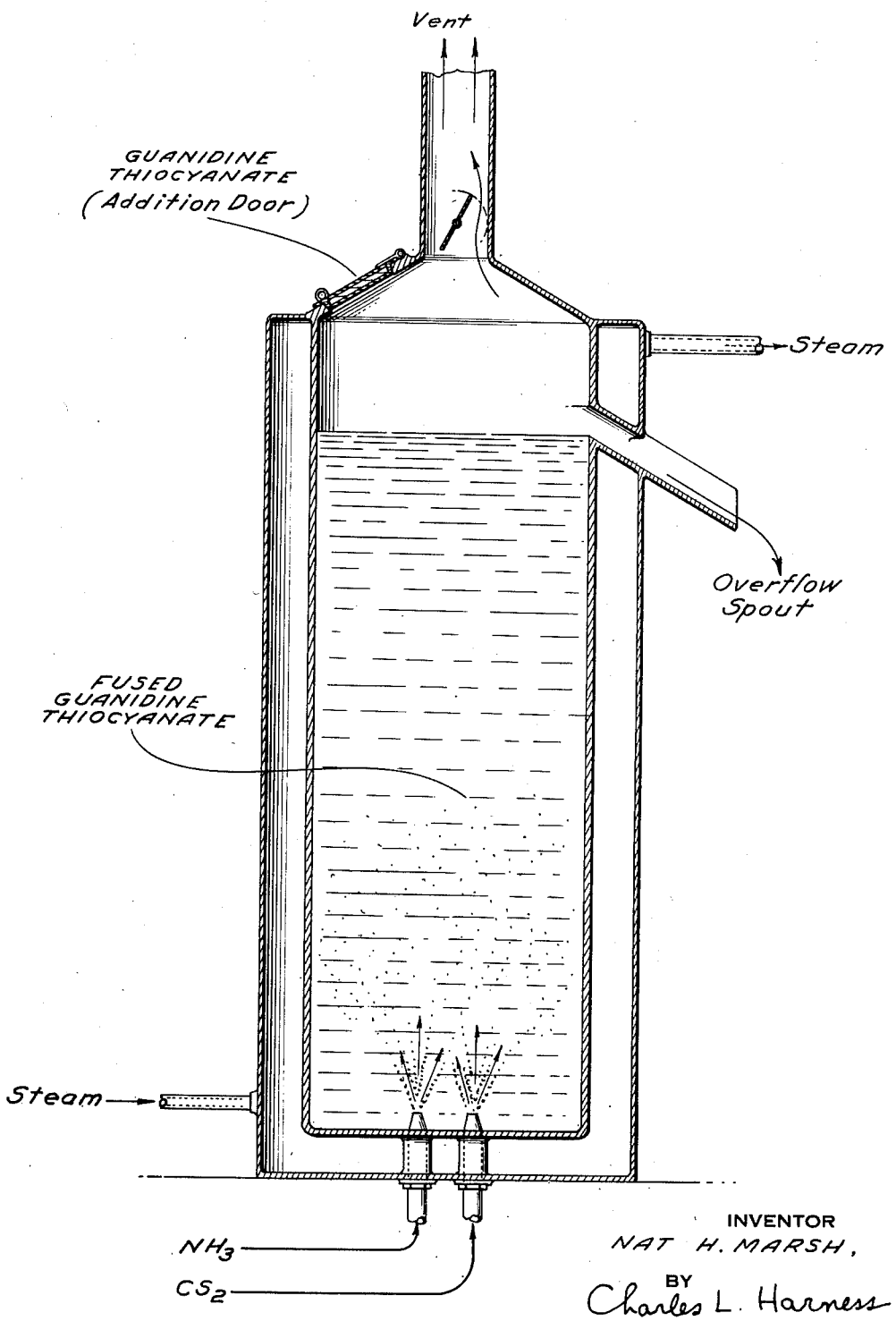

2,615,044

UNITED STATES PATENT OFFICE 2,615,044

PREPARATION OF GUANIDINE THIOCYANATE

Nat H. Marsh, Noroton Heights, Conn., assignor to American Cyanamid Company, New York, N. Y., a corporation of Maine Application August 30, 1950, Serial No. 182,206

2 Claims. (Cl. 260—564)

The present invention relates to the preparation of guanidine thiocyanate.

It is an object of the invention to prepare guanidine thiocyanate at approximately atmospheric pressure by passing gaseous ammonia and gaseous carbon disulfide simultaneously through a molten mass comprising guanidine thiocyanate. It is a further object to prepare guanidine thiocyanate continuously from cheap materials. Additional objects will be apparent from the discussion hereinafter.

The invention contemplates continuously introducing ammonia and carbon disulfide gases at the bottom of a melt of guanidine thiocyanate in a reaction vessel held at a temperature in the range of about 170°–300° C. Under these conditions the ammonia and carbon disulfide react to form guanidine thiocyanate. The reaction chamber (whose dimensions are not critical) is permitted continuously to overflow, and the overflow, which comprises a mixture of guanidine thiocyanate, contaminated with a small amount of ammonium thiocyanate and thiourea, is recovered.

The figure shows an apparatus suitable for operating the invention.

The following example illustrates without limiting the invention.

Example

A reactor such as that shown in the figure (10 cm. inner diameter by 40 cm. to drain spout) is filled almost to the drain spout with guanidine thiocyanate and heated by means of a heating jacket or similar means to a temperature of 210° C. to melt the guanidine thiocyanate and bring it up to reaction temperature. The guanidine thiocyanate initially present can also be added as a melt rather than as a solid if desired. Ammonia and carbon disulfide gases, preferably but not necessarily preheated to the same temperature, are then forced through their respective inlets as shown in the figure at the respective rates of about 16.2 and 8.1 gram moles per hour. Guanidine thiocyanate is thereby formed, causing the reaction vessel gradually to overflow. The overflow product is contaminated with some ammonium thiocyanate and thiourea, from which guanidine thiocyanate is separated by fractional crystallization or other means well known to the art. The effluent gases contain hydrogen sulfide as well as unreacted ammonia and carbon disulfide and can be vented to the atmosphere, or if desired the ammonia and carbon disulfide can be separated from the hydrogen sulfide and cycled. While the preferred temperature range is about 200°–220° C., actually any temperature from about 170°–300° C. can be used. In this example a 2:1 mole ratio of ammonia to carbon disulfide is indicated, this being the preferred ratio, but actually the ratio can be almost without limit, with the result that while the yield of guanidine thiocyanate will be higher, based on the reactant present in the least amount, the yield will be correspondingly lower based on the other reactant. Thus, while the reaction can be carried out at ammonia:carbon disulfide mole ratios of from 0.01–100:1, there is no advantage in using other than the theoretical and preferred ratio of 2:1.

While the invention has been described with particular reference to specific embodiments, it is to be understood that it is not to be limited thereto but is to be construed broadly and restricted solely by the scope of the appended claims.

I claim:

1. The method of preparing guanidine thiocyanate that comprises passing ammonia and carbon disulfide into a molten mass comprising guanidine thiocyanate at substantially atmospheric pressure and at a temperature within the range of about 170°–300° C., whereby the ammonia and carbon disulfide react to form additional guanidine thiocyanate, and recovering the thus-formed guanidine thiocyanate.

2. The method according to claim 1 in which the temperature range is about 200–220° C. and the $NH_3:CS_2$ mole ratio is about 2:1.

NAT H. MARSH.

REFERENCES CITED

The following references are of record in the file of this patent:

Krall: "J. Chem. Soc." (London), vol. 103, 1913, pages 1378, 1381, 1382, 1384, 1386, 1387, 1388, 1389, and 1391.

Marecek: "Chemicky Obzor," vol. 23 (1948), pp. 217–221.